(12) United States Patent
Pritchard

(10) Patent No.: US 9,677,624 B2
(45) Date of Patent: Jun. 13, 2017

(54) HIGH EFFICIENCY HYDRAULIC TRANSFER CASE

(71) Applicant: BorgWarner Inc., Auburn Hills, MI (US)

(72) Inventor: Larry A. Pritchard, Macomb, MI (US)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 14/805,853

(22) Filed: Jul. 22, 2015

(65) Prior Publication Data

US 2016/0032986 A1   Feb. 4, 2016

Related U.S. Application Data

(60) Provisional application No. 62/032,439, filed on Aug. 1, 2014.

(51) Int. Cl.
*F16D 25/12* (2006.01)
*B60K 23/08* (2006.01)
*F16H 61/00* (2006.01)

(52) U.S. Cl.
CPC ........ *F16D 25/123* (2013.01); *B60K 23/0808* (2013.01); *F16H 61/0025* (2013.01); *F16H 2061/0034* (2013.01)

(58) Field of Classification Search
CPC ........ F16D 25/12; F16D 25/123; F16D 25/14; F16D 48/02; F16D 48/06; F16D 48/062; F16D 48/066; F16H 61/0021; F16H 61/0025; F16H 61/0028; F16H 61/0031; F16H 2061/0034; F16H 2061/0046; B60K 23/08; B60K 23/0808; B60K 2023/0816
See application file for complete search history.

(56) References Cited

U.S. PATENT DOCUMENTS

2001/0035323 A1* 11/2001 Porter ..................... F16D 25/14
192/35

* cited by examiner

*Primary Examiner* — Jacob S Scott
(74) *Attorney, Agent, or Firm* — Young Basile Hanlon & MacFarlane, P.C.

(57) ABSTRACT

A power transfer case transfers drive torque from the input member to the output member. The power transfer case includes a lubrication system, a hydraulically actuated friction clutch assembly, and a hydraulically actuated range shift assembly. An on-demand electric lube pump can supply a fluid under pressure. An accumulator is selectively supplied with fluid under pressure from the on-demand lube pump. A first valve selectively directs fluid under pressure from the on-demand lube pump to the lubrication system when in the first position and to the accumulator when in a second position. A second valve selectively directs fluid under pressure from the accumulator to the range shift assembly when in a first position, to the friction clutch assembly when in a second position, and isolates the accumulator from the range shift assembly and the friction clutch assembly when in a third position.

15 Claims, 2 Drawing Sheets

HIGH EFFICIENCY HYDRAULIC TRANSFER CASE

CROSS-REFERENCE TO RELATED APPLICATIONS

This application claims priority to U.S. Provisional Patent Application Ser. No. 62/032,439, filed Aug. 1, 2014.

FIELD OF THE INVENTION

The invention relates to a hydraulic actuated transfer case with clutch actuation and range selection control.

BACKGROUND

Hydraulically actuated transfer cases are generally known in the art. For example, see U.S. Pat. Nos. 5,443,429; 5,803,197; 6,578,654; 6,997,299; 8,425,379; U.S. Published Application No. 2005/0023102A1; U.S. Published Application No. 2006/0042907A1; and International Publication No. WO2006/007086A1. Known hydraulically actuated transfer cases are generally inefficient due to wet sump designs with energy losses due to components splashing in the oil sump, as well as configurations that provide a continuously driven lube pump. Each of these prior known configurations lower the efficiency of the hydraulic transfer case.

SUMMARY

It would be desirable to provide a hydraulic transfer case with increased efficiency. A power transfer case can receive drive torque from a source of drive torque through a rotary input member, and can provide drive torque to an output device through a rotary output member. The power transfer case can transfer drive torque from the input member to the output member. The power transfer case can include a hydraulically actuated friction clutch assembly and a hydraulically actuated range shift assembly. An on-demand lube pump can supply a fluid under pressure. A lubrication system selectively supplied with fluid under pressure from the on-demand lube pump can be provided for lubricating the friction clutch assembly. An accumulator can be selectively supplied with fluid under pressure from the on-demand lube pump. A first valve can selectively direct fluid under pressure from the on-demand lube pump to the lubrication system when in a first position, and to the accumulator when in a second position. A clutch actuation system can be selectively supplied with fluid under pressure from the accumulator for transitioning into or out of a state providing driving continuity between the rotary input member and rotary output member. A range shift actuation system can be selectively supplied with fluid under pressure from the accumulator for shifting into one of a high range, a neutral range, and a low range. A second valve can selectively direct fluid under pressure from the accumulator to the range shift actuation system when in a first position and to the clutch actuation system when in a second position.

A power transfer case can receive drive torque from a source of drive torque through a rotary input member, and can provide drive torque to an output device through a rotary output member. The power transfer case can transfer drive torque from the input member to the output member. The power transfer case can include a lubrication system, a hydraulically actuated friction clutch assembly, and a hydraulically actuated range shift assembly. An on-demand lube pump can be provided for supplying a fluid under pressure. An accumulator can be selectively supplied with fluid under pressure from the on-demand lube pump. A first valve can selectively direct fluid under pressure from the on-demand lube pump to the lubrication system when in a first position, and to the accumulator when in a second position. A second valve can selectively direct fluid under pressure from the accumulator to the range shift assembly when in a first position, to the friction clutch assembly when in a second position, and to isolate the accumulator from the range shift assembly and the friction clutch assembly when in a third position.

A lubrication accumulator can be selectively supplied with fluid under pressure from the on-demand lube pump. A lubrication valve can selectively direct fluid under pressure from the lubrication accumulator to the lubrication system when in a first position, and can isolate the lubrication accumulator from the lubrication system when in the second position.

A method is disclosed for controlling a power transfer case for receiving drive torque from a source of drive torque through a rotary input member, and for providing drive torque to an output device through a rotary output member, where the power transfer case transfers drive torque from the input member to the output member. The power transfer case can include a lubrication system, a hydraulically actuated friction clutch assembly, and a hydraulically actuated range shift assembly. The method can include supplying a fluid under pressure with an on-demand lube pump, selectively supplying fluid under pressure from the on-demand lube pump to an accumulator, selectively directing fluid under pressure from the on-demand lube pump to the lubrication system with a first valve when in a first position and to the accumulator when in a second position, and selectively directing fluid under pressure from the accumulator to the range shift assembly with a second valve when in a first position, to the friction clutch assembly when in a second position, and to isolate the accumulator from the range shift assembly and the friction clutch assembly when in a third position.

The method can also include selectively supplying fluid under pressure from the on-demand lube pump to a lubrication accumulator, and selectively directing fluid under pressure from the lubrication accumulator to the lubrication system with a lubrication valve when in a first position and to isolate the lubrication accumulator from the lubrication system when in the second position.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
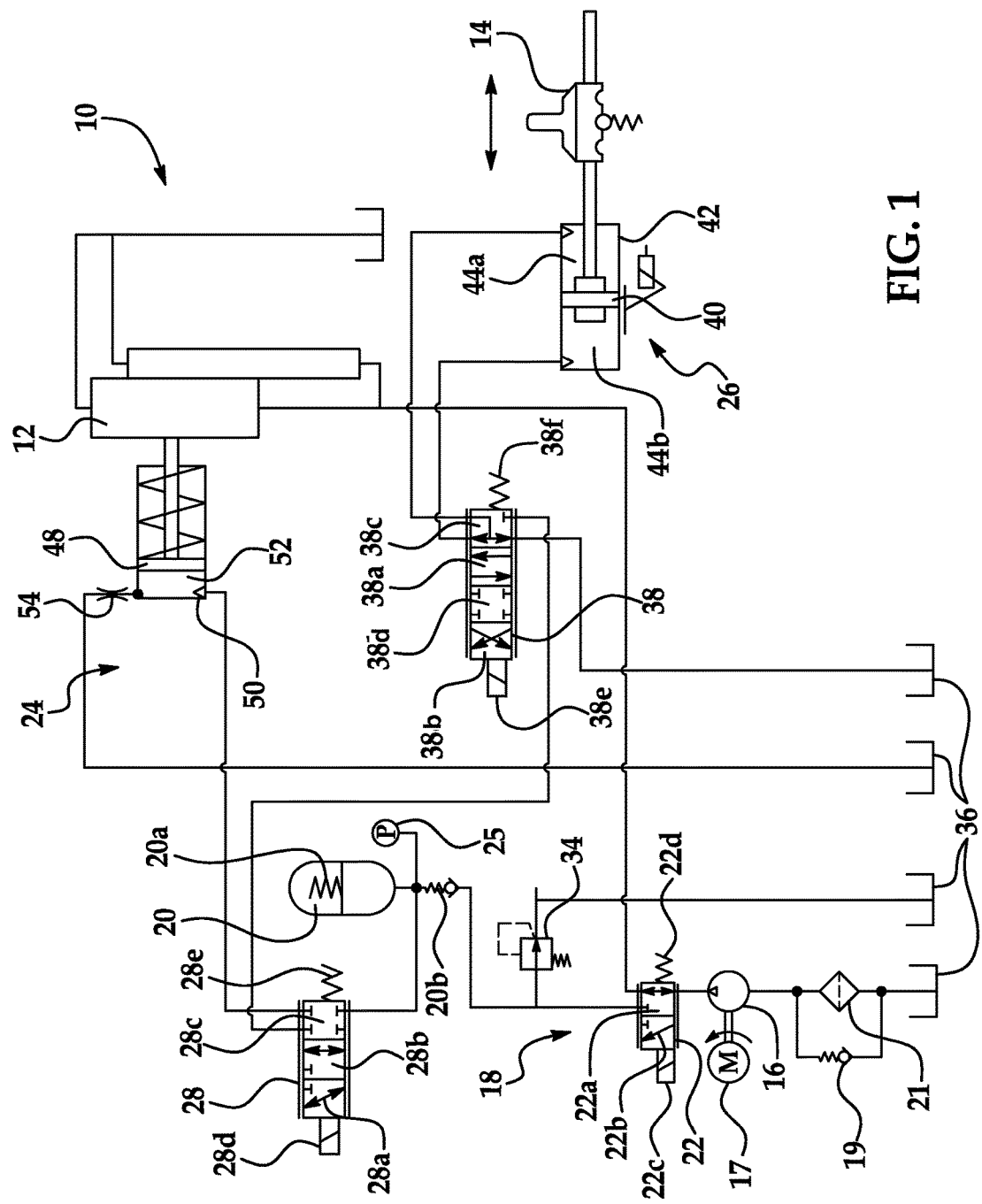
FIG. 1 is a schematic diagram of a hydraulic circuit for a high efficiency hydraulic transfer case with a single on-demand lube pump.
Figure 2:
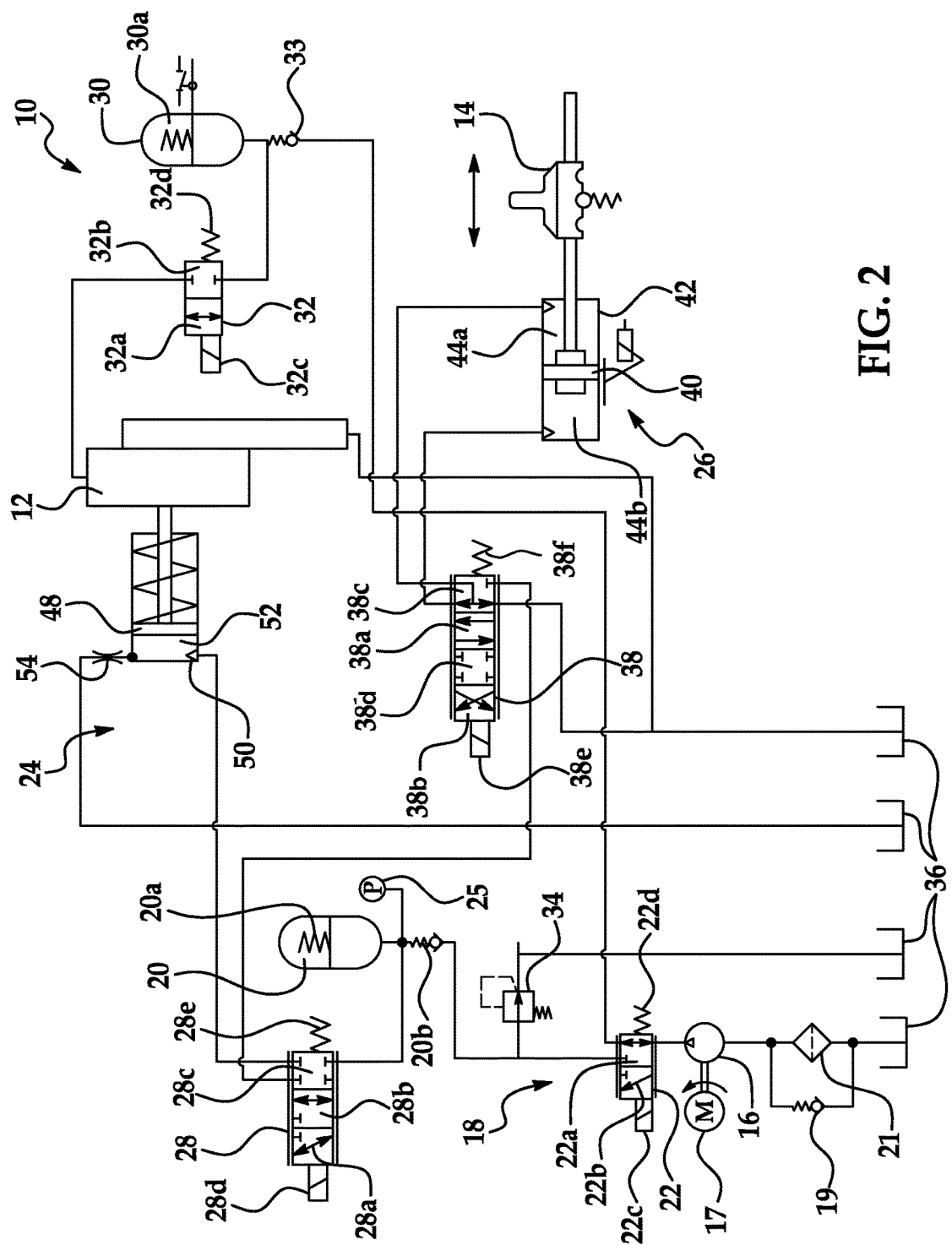
FIG. 2 is a schematic diagram of a hydraulic circuit for a high efficiency hydraulic transfer case with an accumulator for storage of a volume of pressurized fluid for clutch actuation and/or lubrication.

Referring now to FIGS. 1-2, a power transfer case 10 is illustrated for receiving drive torque from a source of drive torque through a rotary input member. The power transfer case 10 can provide drive torque to an output device through a rotary output member, where the power transfer case 10 transfers drive torque from the input member to the output member. The power transfer case 10 can include a hydraulically actuated friction clutch assembly 12 and a hydraulically actuated range shift assembly 14. The power transfer case 10 can include an on-demand lube pump 16 for supplying a fluid under pressure. A lubrication system 18 can selectively be supplied with fluid under pressure from the on-demand lube pump 16 for lubricating the friction clutch assembly 12. An accumulator 20 can selectively be supplied with fluid under pressure from the on-demand lube pump 16. A first valve 22 can selectively direct fluid under pressure from the on-demand lube pump 16 to the lubrication system 18 when in a first position 22a and to the accumulator 20 when in a second position 22b. A clutch actuation system 24 can selectively be supplied with fluid under pressure from the accumulator 20, and/or the on-demand lube pump 16 depending on the position of the first valve 22, for transitioning into or out of a state providing driving continuity between the rotary input member and rotary output member. A range shift actuation system 26 can selectively be supplied with fluid under pressure from the accumulator 20, and/or the on-demand lube pump 16 depending on the position of the first valve 22, for shifting into one of a high range mode of operation, a neutral range mode of operation, and a low range mode of operation. A second valve 28 can selectively direct fluid under pressure from the accumulator 20, and/or the on-demand lube pump 16 depending on the position of the first valve 22, to the range shift actuation system 26 when in a first position 28a and to the clutch actuation system 24 when in a second position 28b, while isolating the accumulator 20 and/or the on-demand lube pump 16 depending on the position of the first valve 22, from the range shift actuation system 26 and the clutch actuation system 24 when in a third position 28c.

By way of example and not limitation, the on-demand lube pump 16 can include a lube pump 16 driven by an electric motor 17. The on-demand lube pump 16 can supply fluid under pressure from a sump or fluid reservoir 36 to the first valve 22. Between the on-demand lube pump 16 and the fluid reservoir 36, a filter 21 can be connected in order to eliminate impurities in supplied fluid. Further, a check valve 19 can be provided in fluid communication between the fluid reservoir 36 and the electric lube pump 16 for allowing fluid bypass flow around the filter 21 if a pressure drop across the filter increases above a predetermined threshold value.

The first valve 22 can be normally biased toward a first position 22a by a biasing member 22d, by way of example and not limitation such as a spring, wherein the first valve 22 can deliver fluid pressure for lubrication of the clutch assembly 12 on demand. The first valve 22 can deliver fluid under pressure toward the accumulator 20 when in the second position 22b. An actuator 22c, by way of example and not limitation such as a solenoid, can be operable for switching the first valve 22 between the first and second position 22a, 22b. By way of example and not limitation, the first valve 22 can have three ports for fluid conduit, such as pipe or hose, connections. Each port can be connected to a fluid conduit to place the first valve 22 in fluid communication with the on-demand lube pump 16, the accumulator 20, and the lubrication system 18, respectively.

By way of example and not limitation, the accumulator 20 can maintain a volume of fluid under pressure with a spring 20a. It should be recognized that the accumulator 20 can use another external source to maintain a volume of fluid under pressure, such as a compressed gas. The accumulator 20 can operate as a type of energy storage device so that fluid under pressure delivered through the first valve 22 is stored and, corresponding to operational purpose, delivered toward the range shift actuation system 26, or the clutch actuation system 24, through the second valve 28 depending on the position of the second valve 28. Between the accumulator 20 and the first valve 22, a check valve 20b can be provided in order to prevent back flow of fluid under pressure from the accumulator 20 toward the first valve 22. By way of example and not limitation, the check valve 20b can be a ball type check valve. The accumulator 20 can be charged by the lube pump 16 in order to store hydraulic energy for use in conjunction with the clutch actuation system 24 or range shift actuation system 26 depending on the position of the second valve 28. The accumulator charge can be monitored by a pressure sensor 25.

The power transfer case 10 can include a pressure relief valve 34. When the first valve 22 is in the second position 22b and the second valve 28 is in the third position 28c, the pressure relief valve 34 can recirculate fluid under pressure from on-demand lube pump 16 to a fluid reservoir 36. The pressure relief valve can be designed or set to open at a predetermined fluid pressure value. When pressure in a fluid conduit between the accumulator 20 and the first valve 22 exceeds the predetermined fluid pressure value, the pressure relief valve 34 returns fluid under pressure to the fluid reservoir 36.

The second valve 28 can be in fluid communication with the clutch actuation system 24 and the range shift actuation system 26 for delivering fluid under pressure from the accumulator 20, and/or the on-demand lube pump 16 depending on the position of the first valve 22, toward the range shift actuation system 26 or the clutch actuation system 24 depending on the position of the second valve 28. By way of example and not limitation, the power transfer case 10 can include a three position—three port valve with a solenoid actuator as the second valve 28. The second valve 28 can have three ports connected to three fluid conduits respectively for fluid communication with the accumulator 20 and/or the on-demand lube pump 16 depending on the position of the first valve 22, the range shift actuation system 26, and the clutch actuation system 24. The second valve 28 can selectively place the accumulator 20, and/or on-demand lube pump 16 depending on the position of the first valve 22, in fluid communication with the range shift actuation system 26 when in a first position 28a, and can selectively place the accumulator 20, and/or the on-demand lube pump 16 depending on the position of the first valve 22, in a fluid communication with the clutch actuation system 24 when in a second position 28b. The second valve 28 can isolate the accumulator 20, and/or the on-demand lube pump 16 depending on the position of the first valve 22, from fluid communication with the clutch actuation system 24 and the range shift actuation system 26 when in a third position 28c. The second valve 28 can include an actuator 28d, by way of example and not limitation such as a solenoid, operable for switching the second valve 28 between the first, second and third positions. The second valve 28 can normally be biased toward the third position 28c for isolating the source of fluid pressure from the clutch actuation system 24 and the range shift actuation system 26 by a biasing member 28e, by way of example and not limitation such as a spring.

When the second valve 28 is in the first position 28a, the accumulator 20, and/or the on-demand lube pump 16 depending on the position of the first valve 22, can be in fluid communication with a third valve 38. By way of example and not limitation, the third valve 38 can be a four position—four port valve with an actuator 38e, such as a solenoid. The third valve 38 can have four ports for fluid connection through fluid conduits to the second valve 28, the fluid reservoir 36, a first expandable chamber 44a of the range shift actuation system 26, and a second expandable chamber 44b on opposite sides of the piston 40 of the range shift actuation system 26, respectively. The third valve 38 can selectively direct fluid under pressure from the accumulator 20, and/or the on-demand lube pump 16 depending on the position of the first valve 22, toward the range shift assembly 14 for driving movement of the range shift assembly in a first direction by expansion of the first expandable chamber 44a of the range shift assembly 14 while placing the second expandable chamber 44b in fluid communication with the fluid reservoir 36 when in the first position 38a, for driving the range shift assembly 14 in an opposite second direction by expansion of the second expandable chamber 44b of the range shift assembly 14 while placing the first expandable chamber 44a in fluid communication with the fluid reservoir 36 when in the second position 38d, for releasing fluid under pressure from both of the first and second expandable chambers 44a, 44b of the range shift assembly 14 through fluid communication with the fluid reservoir 36 when in a third position 38c, and for isolating the first and second expandable chambers 44a, 44b of the range shift assembly 14 from the source of fluid pressure, i.e. accumulator 20 and/or on-demand lube pump 16 and from the fluid reservoir 36 when in a fourth position 38b. The range shift actuation system 26 is operably connected to the range shift assembly 14.

The range shift actuation system 26 can include a piston 40 reciprocally mounted in a housing 42 to define first and second expandable fluid chambers 44a, 44b on opposite sides of the piston 40 with respect to the housing 42. The first expandable fluid chamber 44a can be selectively placed in fluid communication with the accumulator 20, and/or the on-demand lube pump 16 depending on the position of the first valve 22, while the second expandable chamber 44b is placed in fluid communication with the fluid reservoir 36 through the third valve 38 when in the first position 38a. The second expandable fluid chamber 44b can be selectively placed in fluid communication with the accumulator 20 and/or the on-demand lube pump 16 depending on the position of the first valve 22, while the first expandable chamber 44a is placed in fluid communication with the fluid reservoir 36 through the third valve when in the second position 38d. By way of example and not limitation, a double-acting cylinder can be used as the range shift actuation system 26. Fluid under pressure flowing into the first and second expandable fluid chambers 44a, 44b in the range shift actuation system 26 can reciprocally move the piston 40 between first and second end limits of movement corresponding to a high range mode of operation and a low range mode of operation, with a neutral mode of operation defined between the first and second end limits of travel.

When the second valve 28 is in the second position 28b, the accumulator 20, and/or the on-demand lube pump 16 depending on the position of the first valve 22, can be in fluid communication with the clutch actuation system 24. The clutch actuation system 24 can include a spring biased piston 48 reciprocally mounted in a housing 50 and defining an expandable fluid chamber 52 between the piston 48 and housing 50 at one end. The expandable fluid chamber 52 can be in fluid communication with the accumulator 20, and/or the on-demand lube pump 16 depending on the position of the first valve 22, through the second valve 28 when in the second position 28b. By way of example and not limitation, the clutch actuation system 24 can include a single-acting cylinder driven by fluid under pressure to generate movement in one direction and a spring to generate movement in an opposite direction. It should be recognized that in a single-acting cylinder, a velocity in one direction can be differentiated from a velocity in an opposite direction, if desired. The power transfer case 10 can include a flow control valve 54 for regulating fluid flow and/or fluid pressure within the expandable fluid chamber 52.

Referring now to FIG. 2, the lubrication system 18 can include a lubrication accumulator 30 and a lubrication valve 32. The lubrication accumulator 30 can be selectively supplied with fluid under pressure from the on-demand lube pump 16 through the first valve 22 when in the first position 22a. By way of example and not limitation, the lubrication accumulator 30 can maintain a volume of fluid under pressure with a biasing spring 30a or other source pressure maintenance. In order to prevent fluid under pressure in the lubrication accumulator 30 from back flowing toward the first valve 22, the power transfer case 10 can include a check valve 33 located between the lubrication accumulator 30 and the first valve 22. The lubrication valve 32 can selectively direct fluid under pressure from the lubrication accumulator 30 to the lubrication system 18 when in a first position 32a and can selectively isolate the lubrication accumulator 30 from the lubrication system 18 when in the second position 32b. By way of example and not limitation, the lubrication valve 32 can be a two position—two port valve with an actuator 32c, such as a solenoid, selectively allowing pressurized fluid flow between the lubrication accumulator 30 with the hydraulically actuated friction clutch assembly 12. The lubrication valve 32 can normally be biased toward the second position 32b by a biasing member 32d, such as a spring.

A method for controlling a power transfer case 10 can be provided. The power transfer case 10 can be operable for receiving drive torque from a source of drive torque through a rotary input member, and for providing drive torque to an output device through a rotary output member, where the power transfer case 10 transfers drive torque from the input member to the output member. The power transfer case 10 can include a lubrication system 18, a hydraulically actuated friction clutch assembly 12, and a hydraulically actuated range shift assembly 14. The method can include supplying a fluid under pressure with an on-demand lube pump 16. The method can selectively provide fluid communication between the on-demand lube pump 16 and the lubrication system 18 with the first valve 22 when in a first position 22a, and can selectively provide fluid communication between the on-demand lube pump 16 and an accumulator 20 with the first valve 22 when in a second position 22b. The method can include selectively directing fluid under pressure from the accumulator 20 to the range shift assembly 14 with a second valve 28 when in a first position 28a, selectively directing fluid under pressure from the accumulator 20 to the friction clutch assembly 12 with the second valve 28 when in a second position 28b, and selectively isolating the accumulator 20 from both the range shift assembly 14 and the friction clutch assembly 12 with the second valve 28 when in a third position 28c. The method can further include selectively supplying fluid under pressure from the on-demand lube pump 16 to a lubrication accumulator 30 with the first valve in a first position 22a, selectively directing fluid under pressure from the lubrication accumulator 30 to the lubrication system 18 with a lubrication valve 32 when in a first position 32a, and selectively isolating the lubrication accumulator 30 from the lubrication system 18 when in the second position 32b.

Hydraulically actuated power transfer cases have been used in mass production by various companies. The high efficiency hydraulic transfer case takes the concept to the next level in order to address transfer case efficiency needs. In order to increase the efficiency of the transfer case, the disclosed configuration uses a dry sump design, where no components splash in the oil sump. In addition, the disclosed configuration eliminates the continuously driven (by the output shaft) lube pump used in most multispeed transfer cases and replaces the continuously driven lube pump with an on-demand electric lube pump. The same on-demand electric lube pump is used to charge an accumulator in order to store hydraulic energy for both clutch actuation and range shift function. The switching of pump output is accomplished through the use of a solenoid valve to direct pump output to either the accumulator or the lube circuit. FIG. 1 shows a lube circuit that is only active when the electric motor is rotating the pump, while FIG. 2 shows a method for storing lube oil in a low pressure accumulator with a sensor to determine when the accumulator is fully charged. The power transfer case allows the regulation of lube oil by using a two position solenoid valve to control lubrication flow to the clutch assembly. The disclosed configuration would also allow for more motor "off time" by storing both actuation and lube fluid. The power transfer case disclosed fulfills a need for increased efficiency and reduced power consumption.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a power transfer case (10) for receiving drive torque from a source of drive torque through a rotary input member, and for providing drive torque to an output device through a rotary output member, where the power transfer case transfers drive torque from the input member to the output member, the power transfer case including a hydraulically actuated friction clutch assembly (12) and a hydraulically actuated range shift assembly (14), the improvement comprising:
   an on-demand lube pump (16) for supplying a fluid under pressure;
   a lubrication system (18) selectively supplied with fluid under pressure from the on-demand lube pump (16) for lubricating the friction clutch assembly (12);
   an accumulator (20) selectively supplied with fluid under pressure from the on-demand lube pump (16);
   a first valve (22) for selectively direction fluid under pressure from the on-demand lube pump (16) to the lubrication system (18) when in a first position (22a) and to the accumulator (20) when in a second position (22b);
   a clutch actuation system (24) selectively supplied with fluid under pressure from the accumulator (20) for transitioning into or out of a state providing driving continuity between the rotary input member and rotary output member;
   a range shift actuation system (26) selectively supplied with fluid under pressure from the accumulator (20) for shifting into one of a high range, a neutral range, and a low range; and
   a second valve (28) for selectively directing fluid under pressure from the accumulator (20) to the range shift actuation system (26) when in a first position (28a) and to the clutch actuation system (24) when in a second position(28b).

2. The improvement of claim 1, wherein the on-demand lube pump (16) further comprises:
   an electric lube pump (16) supplying fluid under pressure to the first valve (22).

3. The improvement of claim 1, wherein the lubrication system (18) further comprises:
   a lubrication accumulator (30) selectively supplied with fluid under pressure from the on-demand lube pump (16); and
   a lubrication valve (32) for selectively directing fluid under pressure from the lubrication accumulator (30) to the lubrication system (18) when in a first position (32a) and to isolate the lubrication accumulator (30) from the lubrication system (18) when in the second position (32b).

4. The improvement of claim 1 further comprising:
   a pressure relief valve (34) for recirculating fluid under pressure from the on-demand lube pump (16) to a fluid reservoir (36) when the first valve (22) is in the second position (22b) and the second valve (28) is in the third position (28c).

5. The improvement of claim 1 further comprising:
   a third valve (38) for selectively directing fluid under pressure from the accumulator to the range shift assembly (14) for driving the range shift assembly (14) in a first direction when in the first position (38a), for driving the range shift assembly (14) in an opposite second direction when in the second position (38d), for releasing fluid under pressure from the range shift assembly (14) when in a third position (38c), and for maintaining fluid under pressure isolated in the range shift assembly (14) when in a fourth position (38b).

6. The improvement of claim 5, wherein the range shift actuation system (26) further comprises:
   a piston (40) reciprocally mounted in a housing (42) to define first and second expandable fluid chambers (44a, 44b) on opposite sides of the piston (40) with respect to the housing (42), the first expandable fluid chamber (44a) in fluid communication with the accumulator (20) through the third valve (38) when in the first position (38a) and the second expandable fluid chamber (44b) in fluid communication with the accumulator (20) through the third valve when in the second position (38d).

7. The improvement of claim 1, wherein the clutch actuation system (24) further comprises:
   a spring biased piston (48) reciprocally mounted in a housing (50) and defining an expandable fluid chamber (52) between the piston (48) and housing (50) at one end, the expandable fluid chamber (52) in fluid communication with the accumulator (20) through the second valve (28) when in the second position (28b).

8. In a power transfer case (10) for receiving drive torque from a source of drive torque through a rotary input member, and for providing drive torque to an output device through a rotary output member, where the power transfer case (10) transfers drive torque from the input member to the output member, the power transfer case (10) including a lubrication system (18), a hydraulically actuated friction clutch assembly (12), and a hydraulically actuated range shift assembly (14), the improvement comprising:

an on-demand lube pump (16) for supplying a fluid under pressure;

an accumulator (20) selectively supplied with fluid under pressure from the on-demand lube pump (16);

a first valve (22) for selectively directing fluid under pressure from the on-demand lube pump (16) to the lubrication system (18) when in a first position (22a) and to the accumulator (20) when in a second position (22b); and a second valve (28) for selectively directing fluid under pressure from the accumulator (20) to the range shift assembly (14) when in a first position (28a), to the friction clutch assembly (12) when in a second position (28b), and to isolate the accumulator (20) from the range shift assembly (14) and the friction clutch assembly (12) when in a third position (28c).

9. The improvement of claim 8 further comprising:

a pressure relief valve (34) for recirculating fluid under pressure from the on-demand lube pump (16) to a fluid reservoir (36) when the first valve (22) is in the second position (22b) and the second valve (28) is in the third position (28c).

10. The improvement of claim 8 further comprising:

a third valve (38) for selectively directing fluid under pressure from the accumulator (20) to the range shift assembly (14) for driving the range shift assembly (14) in a first position when in a first position (38a), for driving the range shift assembly (14) in an opposite second direction when in a second position (38d), for releasing fluid under pressure from the range shift assembly (14) when in a third position (38c), and for maintaining fluid under pressure isolated in the range shift assembly (14) when in a fourth position (38b).

11. The improvement of claim 10 further comprising:

a range shift actuation system (26) having a piston (40) reciprocally mounted in a housing (42) to define first and second expandable fluid chambers (44a, 44b) on opposite sides of the piston (40) with respect to the housing (42), the first expandable fluid chamber (44a) in fluid communication with the accumulator (20) through the third valve (38) when in the first position (38a), and the second expandable fluid chamber (44b) in fluid communication with the accumulator (20) through the third valve (38) when in the second position (28b).

12. The improvement of claim 8 further comprising:

a lubrication accumulator (30) selectively supplied with fluid under pressure from the on-demand lube pump (16); and a lubrication valve (32) for selectively directing fluid under pressure from the lubrication accumulator (30) to the lubrication system (18) when in a first position (32a) and to isolate the lubrication accumulator (30) from the lubrication system (18) when in a second position (32b).

13. The improvement of claim 8 further comprising: a clutch actuation system (24) having a spring biased piston (48) reciprocally mounted in a housing (50) and defining an expandable fluid chamber (52) between the piston (48) and housing (50) at one end and the expandable fluid chamber (52) in fluid communication with the accumulator (20) through the second valve (28) when in the second position (28b).

14. In a method for controlling a power transfer case (10) for receiving drive torque from a source of drive torque through a rotary input member, and for providing drive torque to an output device through a rotary output member, where the power transfer case (10) transfers drive torque from the input member to the output member, the power transfer case (10) including a lubrication system (18), a hydraulically actuated friction clutch assembly (12), and a hydraulically actuated range shift assembly (14), the method comprising:

supplying a fluid under pressure with an on-demand lube pump (16);

selectively supplying fluid under pressure from the on-demand lube pump (16) to an accumulator (20);

selectively directing fluid under pressure from the on-demand lube pump (16) to the lubrication system (18) with a first valve (22) when in a first position (22a) and to the accumulator when in a second position (22b); and selectively directing fluid under pressure from the accumulator (20) to the range shift assembly (14) with a second valve (28) when in a first position (28a), to the friction clutch assembly (12) when in a second position (28b), and to isolate the accumulator (20) from the range shift assembly (14) and the friction clutch assembly (12) when in a third position (28c).

15. The method of claim 14 further comprising:

selectively supplying fluid under pressure from the on-demand lube pump (16) to a lubrication accumulator (30); and selectively directing fluid under pressure from the lubrication accumulator (30) to the lubrication system (18) with a lubrication valve (32) when in a first position (32a) and to isolate the lubrication accumulator (30) from the lubrication system (18) when in a second position (32b).

* * * * *